United States Patent [19]

Hoffert et al.

[11] Patent Number: 4,850,288

[45] Date of Patent: * Jul. 25, 1989

[54] PRESSURIZED CYCLONIC COMBUSTION METHOD AND BURNER FOR PARTICULATE SOLID FUELS

[75] Inventors: Franklin D. Hoffert, Mountainside; J. David Milligan, Little Silver; James A. Morrison, Trenton, all of N.J.

[73] Assignee: Power Generating, Inc., Fort Worth, Tex.

[*] Notice: The portion of the term of this patent subsequent to Jun. 9, 2004 has been disclaimed.

[21] Appl. No.: 265,293

[22] Filed: Oct. 26, 1988

Related U.S. Application Data

[63] Continuation of Ser. No. 136,454, Dec. 21, 1957, abandoned, which is a continuation of Ser. No. 38,138, Apr. 14, 1987, abandoned, which is a continuation of Ser. No. 772,560, Sep. 4, 1985, Pat. No. 4,671,192, which is a continuation of Ser. No. 625,707, Jun. 29, 1984, abandoned, and a continuation of Ser. No. 626,417, Jun. 29, 1984, abandoned.

[51] Int. Cl.$^4$ .............................. F23D 1/00; F23B 5/00
[52] U.S. Cl. ..................................... 110/214; 110/216; 110/244; 110/264; 110/265
[58] Field of Search .................. 110/261–265, 110/210, 214, 243, 244, 216

[56] References Cited

U.S. PATENT DOCUMENTS

| | | | |
|---|---|---|---|
| 901,232 | 10/1908 | Eldred | 110/263 |
| 2,678,615 | 5/1954 | Soderlund et al. | 110/244 |
| 3,589,315 | 6/1971 | Hart | 110/265 |
| 3,837,303 | 9/1974 | Baadson | 110/244 |
| 4,245,571 | 1/1981 | Przewalski | 110/216 |
| 4,351,251 | 9/1982 | Brashears | 110/264 |
| 4,379,433 | 4/1983 | Hoskinson | 110/214 |
| 4,422,388 | 12/1983 | Raskin | 110/264 |
| 4,475,472 | 10/1984 | Adrian et al. | 110/214 |
| 4,502,395 | 3/1985 | Barnett | 110/214 |
| 4,515,093 | 5/1978 | Beardmore et al. | 110/264 |

Primary Examiner—Henry C. Yuen
Attorney, Agent, or Firm—Arthur F. Zobal

[57] ABSTRACT

A pressurized cyclonic combustion method and a cylindrical burner apparatus for pressurized combustion of particulate solid fuels to produce a pressurized clean effluent gas. In the burner, the particulate solids such as wood chips are fed tangentially into a primary combustion chamber at its inlet end and flow at high tangential velocity in a helical path through the burner. Oxygen-containing combustion gas such as air is supplied tangentially at high velocity through multiple ports spaced along the burner length to maintain and/or increase the high tangential velocity and produce high centrifugal forces on the particulate solids and provide for prolonged combustion and produce high burner volumetric heat release rates exceeding about 400,000 Btu/hr ft$^3$. A choke opening is provided centrally located at the combustion chamber outlet end for promoting prolonged combustion of solid fuel paarticles upstream of a quench zone. A secondary combustion chamber is provided downstream of the choke opening. Also, a quench gas stream is introduced into the choke zone preferably in a tangential flow direction opposite to the helical flow in the burner primary combustion chamber, so as to effectively mix the quench gas with the hot effluent gas and reduce its temperature, usually to about 1400°–2000° F. as determined by downstream metallurgy considerations. The resulting pressurized effluent gas can be further processed to remove any existing fine solids, and the clean pressurized gas can then be expanded in a gas turbine to produce useful power.

17 Claims, 5 Drawing Sheets

PRESSURIZED CYCLONIC COMBUSTION METHOD AND BURNER FOR PARTICULATE SOLID FUELS

This Application is a continuation of co-pending U.S. patent application Ser. No. 136,454, filed on Dec. 21, 1987, abandoned, which is a continuation of U.S. patent application Ser. No. 38,138, filed on Apr. 14, 1987, abandoned, which is a continuation of U.S. patent application Ser. No. 772,560 filed on Sept. 4, 1985, U.S. Pat. No. 4,671,192, which is a continuation of U.S. patent application Ser. Nos. 625,707, filed June 29, 1984, abandoned and 626,417 filed on June 29, 1984, abandoned.

BACKGROUND OF INVENTION

This invention pertains to a pressurized cyclonic combustion method and burner apparatus for effective combustion of particulate solid fuels to produce clean pressurized hot effluent gases. It pertains particularly to a cylindrical pressurized burner which utilizes helical flow patterns to provide prolonged combustion of the fuel solids and uses an intermediate choke zone and an air quench step to improve combustion and control temperature of the effluent gases produced.

Various types of burners for particulate solid fuels have been previously proposed such as disclosed by U.S. Pat. No. 2,614,513 to Miller et al; U.S. Pat. No. 2,769,411 to Simmons; and U.S. Pat. No. 2,881,720 to Lotz which utilize tangential swirling flow patterns and a restricted exit opening intended to retain solids in the burner longer for more complete combustion. U.S. Pat. No. 3,199,476 to Nettel discloses a similar burner for coal having dual tangential inlet for the small and coarser coal particles, a restricted throat exit for combustion gases and a lower drain port for slag removal. Other similar burners have been disclosed by U.S. Pat. No. 3,244,220 to Kloecher; U.S. Pat. No. 3,453,976 and U.S. Pat. No. 3,472,185 to Burden et al, but they do not have restricted outlets and are not intended for pressurized operations. U.S. Pat. No. 3,777,678 and U.S. Pat. No. 4,033,505 to Lutes et al disclose a horizontal cyclonic type burner for combustible solid materials in which fuel is introduced tangentially into the combustion chamber at its inlet and combustion air is introduced tangentially along the length of the burner, which has a restricted choke outlet. Also, U.S. Pat. No. 4,422,388 to Raskin discloses a horizontal cylindrical burner for solid fuel introduced tangentially at one end, but maintains a fluidized bed of fuel in its lower portion. In addition, scroll or dual register horizontal fired type burners such as the Coen DAZ burner have been used for the combustion of the air conveyed solid fines. Such burners have dual registers with concentric louvers which in effect divide the air stream into two counter-rotating concentric streams which scrub against each other and provide turbulent mixing action for the fuel introduced into the annular space between the dual air streams.

It is noted that these prior art burners are useful for burning particulate solids at essentially atmospheric pressure for incineration and also for the recovery of heat energy. However, further improvements are needed in combustion of particulate solid fuels at above atmospheric pressure and in burner design for achieving higher throughputs for the fuels and higher heat release rates in the burner to produce relatively solids-free pressurized hot effluent gases suitable for power recovery applications.

Burning solid fuels, unlike burning vaporous and volatile liquid fuels, require increase reaction time constants which are orders of magnitude longer for complete combustion, i.e., mass diffusivity is rate controlling in the rapid oxidation of solid fuels. Historically, this longer combustion time requirement has been minimized by solids size reduction, as in firing pulverized coal instead of chunk or briquette coal. While such size reduction is beneficial, it still does not permit the firing of solid fuel materials at combustion rates which approximate those attained for nonsolid fuels. This difference is most apparent when volumetric energy releases for various heat generators are compared.

In order to increase the fuel particle retention time in a burner, which time varies inversely with combustor size for a given heat release, a new method for achieving increased dual phase residence time for the solid fuel particles has now been developed. In this method, the solid fuel particles having higher mass are retained for very long periods of time relative to the lower mass combustible volatiles and gaseous materials in a cylindrical combustion chamber having an aspect ratio of longitudinal length more than about twice that of the chamber inside diameter. Into this combustion chamber the particulate solid fuel is introduced tangentially in lean phase transport near the inlet end. The fuel tangential velocities in the burner are sufficient so that very high centrifugal forces are imposed on the fuel particles which are swirled around the inner periphery the burner, while the gaseous material not as subject to such centrifugal forces and moving by molecular motion is free to move along the burner longitudinal axis while rapidly combusting, and then escape through a modulating restriction opening at the burner exit end.

The solid fuel particles are maintained in this helical flow pattern, trapped by their relatively high mass and high rotational velocity, slowly moving helically and at high Reynolds number condition toward the outlet end of the combustion chamber. This extended combustion path is significantly prolonged by the tangential injection of combustion air along the longitudinal axis of the burner at a high velocity. This combustion air is introduced under conditions of high tangential velocity and associated high Reynolds number, so as to impart an additional tangential acceleration to the fuel particles sufficient to overcome any reduction in velocity due to flowing resistance of the orbiting particles. Accordingly, this combustion process is continued under high Reynolds number conditions until the fuel particles are sufficiently destructed to produce gaseous products which escape the centrifugal forces in the combustion chamber and pass out at the burner exit end.

The gas residence time in the combustion chamber is a function of the volumetric throughput only, however, the fuel solids residence time is pathway dependent and is determined by the combustion chamber circumference and the number of revolutions divided by the velocity of the particles. Therefore, a particle can be retained in the burner to destruction for a much longer time than can volatile fuels and products of combustion which accompany the particle.

This improved combustion method also promotes more rapid combustion of solid fuels by forcing the circulating particles closely adjacent to the hot radiating interior surfaces of the combustion chamber. This radiating surface is quite large relative to the particle and served to sustain the reaction by constantly providing the threshold energy needed for combustion. The addition of the acceleration air along the helical path of the fuel particle promotes rapid oxidation by continually supplying fresh oxygen very near the particulate fuel solids undergoing reaction.

The addition of combustion air tangentially along the length of the combustion chamber also provides an additional benefit to the mechanical integrity of the burner by buffering and tempering the surface of the heat resistant refractory insulation material lining the interior of the burner chamber from the very hot products of combustion. This air addition prevents the insulation surface from reaching reaction temperatures which would be deleterious to the insulation. This air-sweep is enhanced by the design and installation of the air inlet tuyeres.

Accordingly, it is an object of the present invention to provide a pressurized cyclonic combustion method and burner apparatus for particulate solid fuels which provides for prolonged combustion of the fuel particles at conditions of high tangential velocities, high centrifugal forces, and high Reynolds numbers. Another object is to provide such a burner which operates at highly turbulent conditions and high Reynolds numbers and provides very high volumetric heat release rates approaching those for liquid and gaseous fuels. Another object is to provide a burner for solid particulate fuels such as wood chips which produces a clean hot pressurized effluent gas stream suitable for use in power producing processes.

SUMMARY OF INVENTION

The present invention provides an improved combustion method and burner apparatus for the pressurized combustion of particulate solid materials to produce hot pressurized effluent gases having low solids content. In the method of the invention, a particulate solid fuel having particle size smaller than about 0.70 inch major dimension is pressurized and pneumatically fed tangentially into the burner primary combustion chamber operated at a pressure at least about 3 atm. absolute and usually not exceeding about 20 atm. pressure. The superficial gas velocity for fuel transport into the burner primary combustion chamber should be at least about 80 ft/sec and preferably about 90–120 ft/sec. An oxygen-containing combustion gas is also supplied into the combustion chamber tangentially through multiple tuyeres at a high tangential velocity exceeding about 100 ft/sec and at a Reynolds number relative to the tuyere openings exceeding about 900,000. The fuel particles and combustion gas in the combustion chamber flow in a swirling helical motion or flow pattern at high tangential velocity exceeding about 100 ft/sec, so as to provide high centrifugal forces on the particles exceeding about 140 gravitational or 'g' units. Because of the rotational motion and the high centrifugal forces generated on the fuel particles, the burner according to the present invention retains the fuel particles in the burner combustion chamber near the hot wall for a substantially longer time than occurs for conventional prior art burners, so that the fuel solids are more rapidly and completely combusted. Also, this high rotational velocity and high centrifugal force flow pattern not only retains the particulate solids in the burner longer for more complete combustion, but additionally achieves flows at very high Reynolds numbers exceeding about 150,000 and provides for very high volumetric heat release rates in the burner exceeding about 400,000 Btu/hr ft³ chamber volume, which substantially exceed the heat release rates provided by conventional solid fuel burners. Furthermore, the present burner advantageously provides heat release rates for burning particulate solid fuels comparable to those for burning liquid or gaseous fuels in gas turbine and internal combustion engines.

Accordingly, it is an important feature of the present invention that the fuel particles remain near the hot radiant wall of the combustion chamber until all volatile matter is continually evolved from the fuel particles, which steadily diminish in size until the particles are substantially completely combusted into gas. Also, because the burner inside length to diameter ratio is at least about 2.5 and can advantageously be up about 10, this cylindrical configuration contributes to the fuel particles remaining in the burner primary combustion zone significantly longer for more complete combustion than for prior burner configurations.

The hot pressurized effluent gas produced in the primary combustion zone is usually at temperature of about 2100°–2800° F. and is cooled by mixing it with a quench gas such as additional air or steam in a quench zone to reduce the gas temperature to a lower temperature as desired, such as limited only by the characteristics of a power recovery turbine, and usually to about 1400°–2000° F. Any remaining solids in the effluent gas can be removed in a gas-solids separation step prior to expansion in a gas turbine for producing useful power.

In the embodiment disclosed any remaining particulate solids in the effluent gas leaving the burner are mechanically separated from the gas in a cyclone separator, after which the clean gas is then expanded to a lower pressure through a gas turbine for driving a compressor to provide the pressurized combustion air required in the burner. The gas turbine provides net shaft power output for driving a load, which is usually an electric power generator.

The present invention also provides a burner apparatus for pressurized combustion of particulate solid fuels to produce a hot pressurized effluent or product gas. The burner includes an elongated cylindrical shaped pressurizable outer metal casing, an inner refractory lining located adjacent the casing inner wall to provide an elongated cylindrical shaped primary combustion chamber, a tangential opening located near the burner inlet end for feeding a particulate fuel tangetially into the primary combustion chamber, a plurality of tangentially oriented openings each having an aspect ratio at least about 2:1 and spaced apart longitudinally along the length of the burner for introducing a combustion gas tangentially into the combustion chamber, a choke opening located at the combustion chamber exit end, and at least one aperture located tangentially in the choke opening, the aperture being preferably oriented opposite to the tangential opening in the combustion chamber inlet end, whereby the particulate fuel is combusted rapidly at high rotational velocity and high volumetric heat release rate and the resulting hot effluent gas is quenched and cooled to provide a lower temperature pressurized product gas. Downstream from the choke, a secondary cylindrical combustion chamber is connected pressure-tightly to the outer casing of the primary combustion chamber. The choke zone between the two chambers is tapered outwardly into the secondary chamber, so as to minimize irrecoverable pressure differential for the product gas flowing therethrough.

The burner of the present invention is useful for burning various combustible particulate solid materials, such as sawdust, wood chips, trim and shavings, petroleum coke, and mixtures thereof. The burner is particularly useful for combusting wood chips smaller than about 0.70 inch and preferably smaller than about 0.130 major dimension.

It is an advantage of the present pressurized combustion method and burner apparatus that because of the greater length/diameter ratio provided in the burner and the high rotational velocities and centrifugal forces achieved for the fuel particles, the particulate solids are retained in the burner for a significantly longer time for achieving more complete combustion, thereby producing higher volumetric heat release rates and a cleaner product gas. Because of the high rotational velocity of the combustible particles in the burner and the resulting high centrifugal forces developed, the burner is substantially unaffected by gravity and can be operated while oriented in any direction. Also because the resulting hot effluent gas is effectively quenched with air, steam or mixture thereof, the effluent gas is provided at a controlled lower temperature which is advantageous for subsequent power recovery from the gas in an engine or turbine.

BRIEF DESCRIPTION OF DRAWINGS

The invention will be further described with reference to the accompanying drawings, in which.

DETAILED DESCRIPTION OF INVENTION

Figure 1:
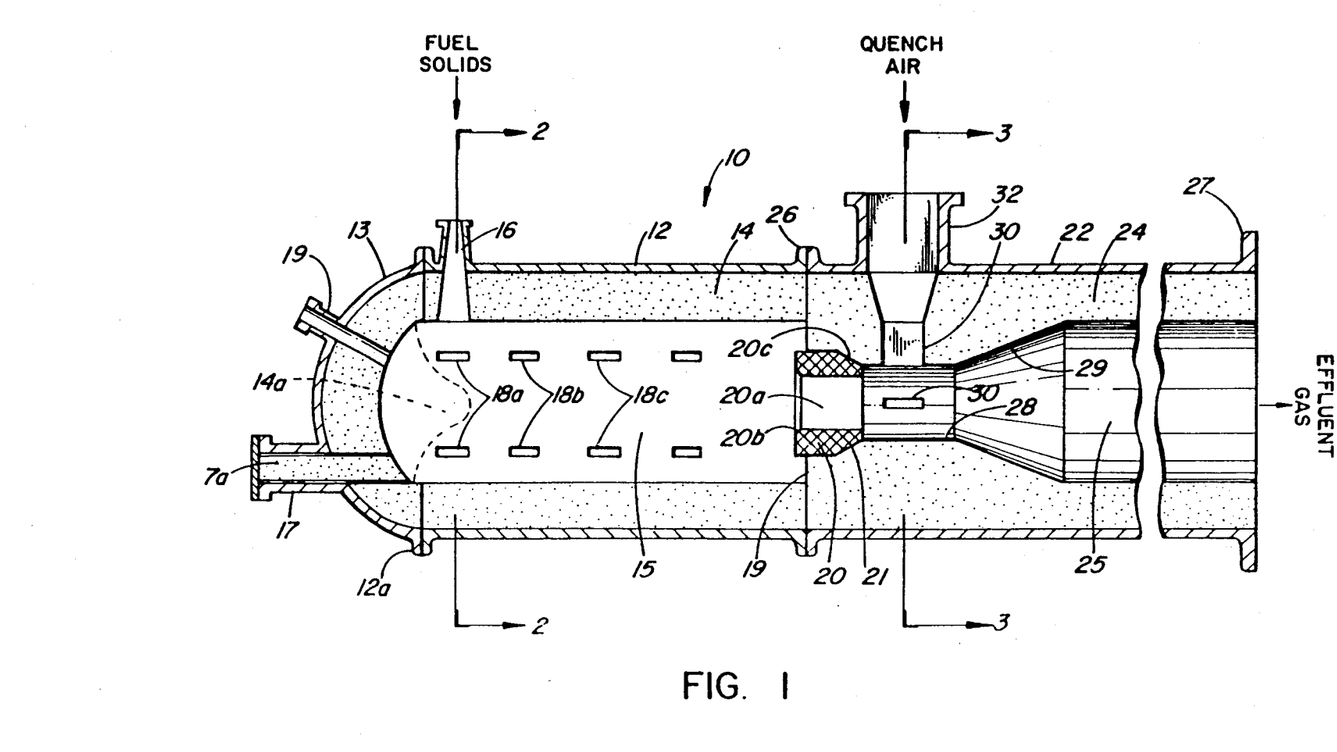
FIG. 1 shows a longitudinal cross-sectional view of a cyclonic burner assembly according to the present invention, including the primary and secondary combustion chambers.

A pressurized cyclonic burner for providing prolonged pressurized combustion of particulate solid fuels and constructed and operated in accordance with the present invention is shown in FIG. 1. In the illustrated preferred embodiment, the burner assembley 10 has a cylindrical shaped pressurizable outer metal casing 12 and a head 13, which are retained together by bolted flange 12a. A refractory lining material 14 is located adjacent the inner wall of casing 12 and within head 13 and defines a primary combustion chamber 15, with the lining material being suitable for withstanding temperatures up to about 3000° F.

The particulate solids combustible fuel material, such as wood chips preferably smaller than about 0.130 inch major dimension, is uniformly fed by suitable means (not shown) into the burner primary combustion chamber 15 at tangential inlet connection 16 located near the inlet end head 13 of the burner. In the chamber, the solids are air entrained at tangential velocity at least about 80 ft/sec and preferably 100-200 ft/sec. If desired, to improve ignition of the particulate solids feed entering the combustion chamber, the end wall 14a of refractory lining 14 can be made convex shaped and extend axially into the combustion chamber to a location not more than about 0.5 the burner internal diameter past the plane of the fuel inlet 16, as shown in dotted lines in FIG. 1. This arrangement results in the solids feed material moving closer to the hot refractory surface 14a to provide for more effective radiant heating of the feed.

Figure 2:
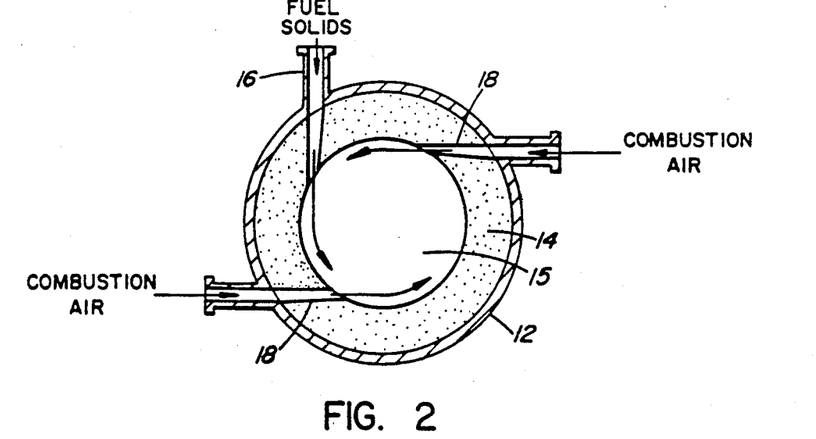
FIG. 2 shows a cross-sectional view of the burner feed inlet taken along lines 2—2 of FIG. 1.
Figure 3:
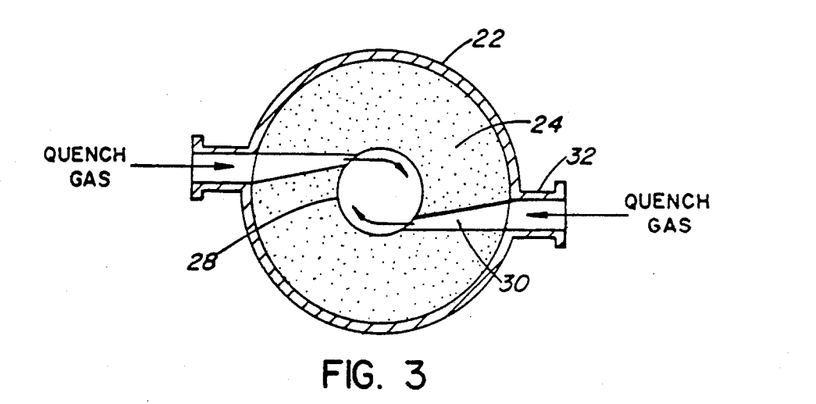
FIG. 3 shows a cross-sectional view taken through the burner choke section alongs lines 3—3 of FIG. 1.

Multiple tangential inlet openings or tuyeres 18a, 18b, 18c, etc., are provided through casing 12 and lining 14 and spaced apart along the length of the burner for supplying combustion air into the combustion chamber. The tuyere openings 18, 18a, etc., are preferably provided as double rows, as shown in FIG. 2 sectional drawing, with at least 3 and usually not more than 20 such tuyere openings in each row. The tuyere openings 18, 18a, etc., are made elongated in shape in a direction parallel to the longitudinal axis of the burner. The tuyere openings preferably should have a length/width aspect ratio exceeding about 2:1 and preferably in a range of 3:1 to 5:1.

The combustion air is supplied through the tuyere openings at a velocity exceeding about 100 ft/sec and at a Reynolds number relative to the tuyere openings exceeding about 900,000. The combustion air is preferably supplied through the tuyeres at tangential velocity of 110–150 ft/sec and at Reynolds number of 1,000,000–3,000,000. A flanged clean-out openings 17 is provided through the lower portion of head 13 and includes a removable refractory plug 17a. Also, a sight tube 19 is provided through the upper portion of head 13 for viewing the combustion process within chamber 15.

The combustion chamber 15 is operated at internal pressure of about 3–20 atm. absolute and preferably 4–10 atm. The useful weight ratio of combustion air to the particulate fuel feed ranges from about 1.0 to 4.0 times the stoichiometric value.

At the exit end of the burner combustion chamber 15, a centrally-located choke element 20 is provided which has a generally cylindrical opening 20a therethrough, and has a cross-sectional area appreciably smaller than that for the combustion chamber 15. The opening 20a in choke 20 should be made small enough to help retain the circulating combusting solids in the primary combustion chamber, so as to prolong the solids residence time for substantially complete combustion therein, but the opening is not made so small that undesired differential pressure for the effluent gases flowing through the choke is appreciably increased. The diameter of the choke 20 should be at least about 30% that of the combustion chamber 15, and usually is 40–50% of the diameter of the combustion chamber. Also, if desired to facilitate the passage of ash from the primary combustion chamber, the choke opening 20a can be located near the lower portion of the chamber, or alternatively, the opening can be made non-circular shaped with a portion of the opening extending downwardly towards the lower wall of the chamber. This choke 20 is usually made annular shaped and is preferably formed as a castable refractory material that is more abrasion-resistant than the refractory lining 14. The choke 20 preferably has a curved inlet surface 20b and a tapered outer surface 20c to assist in retaining it in place in the surrounding refractory material 24. Also, if desired, a refractory cement material 21 can be used between the choke element 20 and the surrounding refractory material 24 to help hold the choke in place.

For the burner of the present invention, visual observations made of the solid fuel particles in the burner during combustion operation indicate that the particles move in a helical flow path which is nearly perpendicular to the longitudinal axis of the burner, thus indicating that the helix angle of the particle path relative to the burner axis is only slightly less than 90°. This flow pattern indicates that the fuel particles make a great number of revolutions in the burner primary combustion chamber until they are completely devalatilized and consumed. Also, because of the particle rotational velocity, the particulate solids respond to high centrifugal forces produced in the burner and the gaseous products of combustion respond to Reynolds numbers which are very high. By using the burner configuration of this invention, the volumetric heat release rates for pressurized burning of particulate solid fuels are significantly higher than for conventional type burners, and approach heat release rates which occur for burning liquid or gaseous fuels in internal combustion engines.

Because of the high tangential velocity and high centrifugal forces generated on the solid fuel particles in the burner primary combustion zone 15, the particulate solids make very many revolutions therein and are thus retained in the combustion zone adjacent the hot refractory lining 14 for a substantially longer residence time until all the solids have been devalatilized and combusted, thereby achieving the very high volumetric heat release rates. The centrifugal force produced on the particulate solids being burned exceeds about 140 times earth gravity 'g' and is preferably about 150–300 g, and Reynolds number for the hot effluent gases is at least about 150,000 and preferably 200,000–500,000. The volumetric heat release rates in the burner primary combustion chamber is at least about 400,000 Btu/hr ft$^3$ primary combustion chamber volume, and is preferably 500,000 to 3,000,000 Btu/hr ft$^3$.

A secondary cylindrical shaped combustion chamber 25 is preferably provided downstream from the primary chamber 15 and choke 20, and about 25% of the total combustion may occur in the secondary chamber. Secondary combustion chamber 25 has a cylindrical shaped metal casing 22 surrounding a refractory lining 24. The casing 22 is connected pressure-tightly to the casing 12 of primary combustion chamber 15 by bolted flange 26, and can be connected pressure-tightly to downstream ducting as desired by flange 27. Also, refractory lining 24 abuts against the refractory lining 14 at a location radially outwardly from choke 20. A reduced diameter intermediate zone 28 is provided immediately downstream from choke 20 and usually has a length: diameter ratio of about 1:1 to 1.5:1. The intermediate zone 28 is followed by outwardly tapered zone 29 connecting to a full diameter zone of secondary chamber 25 having an inside diameter approximately the same as for the primary combustion chamber 15.

A quench gas such as additional pressurized air or steam is provided into secondary chamber 25 through at least one opening 30 through refractory 24 located immediately downstream from choke 20 for quenching and cooling the hot effluent gas flowing from the choke. Usually two openings 30 are provided and preferably oriented in a tangential direction opposite to that for the fuel inlet 16 and multiple openings 18 for the combustion air in the primary combustion chamber 15. Thus, the counter or oppositely flowing quench gas stream flowing tangentially from conduit 32 through openings 30 provides a high velocity shear type mixing flow pattern for the quench gas and the hot effluent gas upstream from secondary combustion chamber 24, thereby advantageously achieves highly effective mixing of the hot effluent gas and the quench gas so as to lower the hot effluent gas temperature from about 2700° F. to a lower temperature, such as 1500°–1800° F. suitable for passing to a gas turbine. The preferred quench gas is pressurized air because of its general availability. The useful weight ratio of the quench air to the combustion gas upstream of choke 20 is from about 0.8 to about 1.5. If steam is used as the quench gas, the steam conditions and amount used should be such that no condensate is provided in the gas turbine exhaust. Also, to facilitate transfer of ash from the lower portion of the primary combustion chamber 15 into the secondary combustion chamber 25, a passageway is provided which bypasses the choke 20.

The pressurized cyclonic combustion method and burner apparatus of this invention will be further described with reference to the following example, which should not be construed as limiting the scope of the invention.

EXAMPLE

A cylindrical shaped cyclonic type pressurizable test burner was constructed to have structural features and performance characteristics according to the present invention, as listed below in Table I, which provides a comparison with two similar conventional horizontal burners and a prototype cylindrical shaped cyclonic burner used for burning particulate solid fuels and having similar nominal or total heat release ratings. This new test burner was operated by burning wood chips having particle size smaller than about 0.125 inch, which were fed tangentially into the burner under pressurized operating conditions as listed in Table I. For this burner comparison, the particulate fuel is introduced into each burner at essentially ambient temperature. Numerous observations of the burner operation by viewing through ports indicated that the solid particles in the primary combustion chamber swirled around in a helical flow path about the periphery of the burner until consumed. Table I also shows the test burner operating results achieved as compared to performance characteristics of the other similar conventional non-pressurized burners.

TABLE I

| | Burner Construction and Comparative Performance Characteristics | | | |
|---|---|---|---|---|
| | | | Burner Per Invention | |
| Type of Burner | Dual Register* | Commercial Cyclonic | Test Unit | Prototype |
| Combustion Chamber Inside Diameter, in. | 48 | 48 | 20 | 27 |
| Primary Combustion Chamber Volume, ft$^3$ | 226 | 24.6 | 10 | 28 |
| Burner Aspect Ratio, | | | | |

TABLE I-continued

Burner Construction and Comparative Performance Characteristics

| Type of Burner | Dual Register* | Commercial Cyclonic | Burner Per Invention Test Unit | Burner Per Invention Prototype |
|---|---|---|---|---|
| Internal Length/Diameter | 4.5 | 2 | 3 | >3 |
| Restriction Ratio, Choke dia./Burner I.D. | None | 0.2 | 0.3 | 0.3 |
| Solid Fuel Burned | | *Dried Particulate Wood | | |
| Internal Pressure, atm. abs. | 1 | 1 ± .01 | 4.5 | >6.5 |
| Fuel Solids Tangential Velocity into Burner, fps | Nil | 75–80 | 80–100 | 80–100 |
| Combustion Air Inlet Aspect Ratio | Non Applicable | 2 | 2 | 3 |
| Reynolds Number for Combustion Air At Tuyeres | Not Applicable | 806,000 | 1,060,000 | >2,000,000 |
| Centrifugal Force on Fuel Solids in Burner, g | 1 | 130 | 200 | >150 |
| Nominal Heat Release, $10^6$ Btu/hr | 15 | 23.4 | 18.6 | 50 |
| Volumetric Heat Release Rate, $10^6$ Btu/hr ft$^3$ | 0.07 | 0.23 | 1.86 | >1.9 |
| Reynolds Number in Combustion Chamber | 40,000 | 103,000 | 279,000 | 400,000 |
| Auxiliary Air Inlet Reynolds Number | None | None | 4,040,000 | >4,000,000 |
| Secondary Combustion Chamber length, in. | None | Undefined | 60 | 78 |

*5–10% supplemental fuel required for flame stability in burner.

Figure 4:
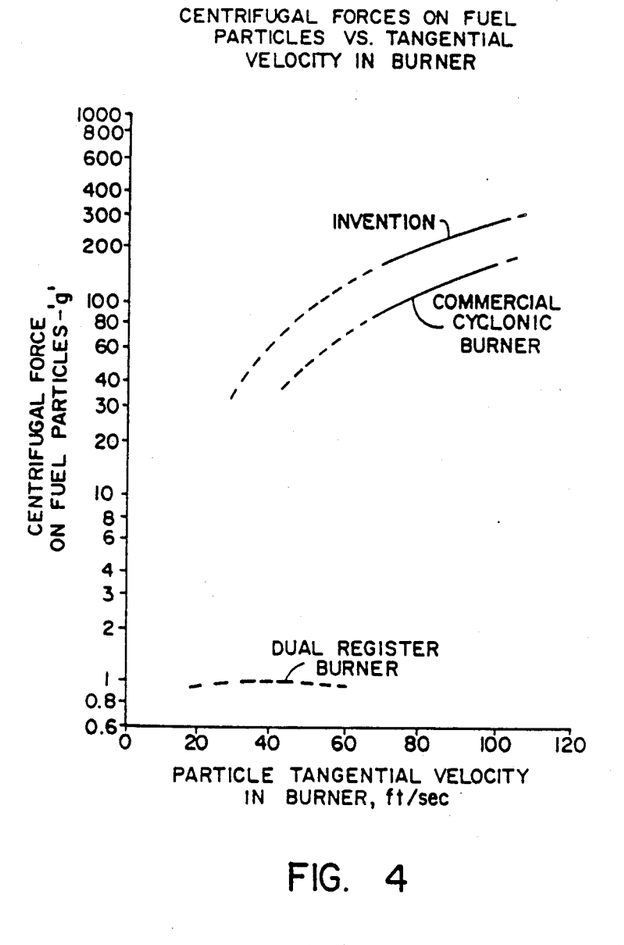
FIG. 4 is a graph showing the centrifugal forces plotted vs. tangential velocity for fuel particles in the burner, compared to similar conventional burners.
Figure 5:
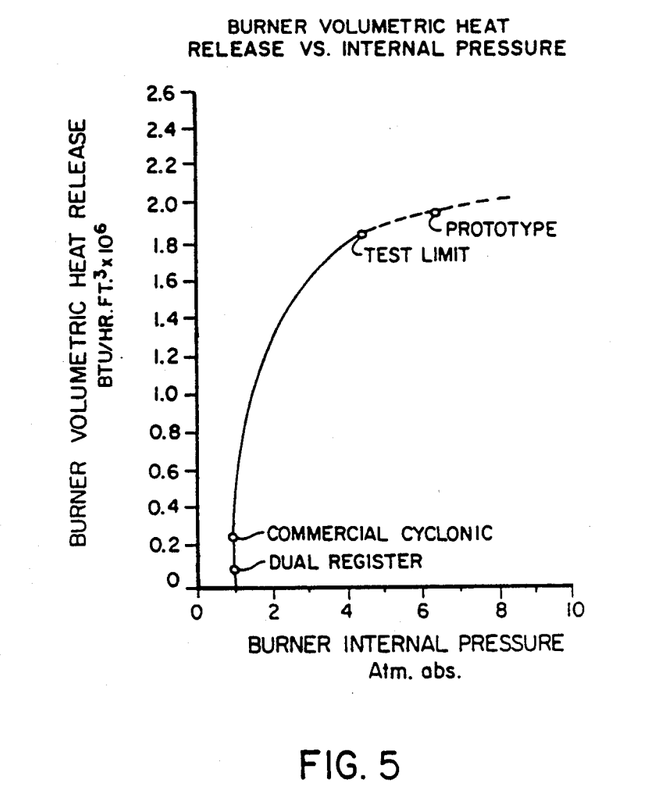
FIG. 5 is a graph showing volumetric heat release rate plotted vs. internal pressure for the burner of the present invention compared to similar conventional burners.

From the above comparison of the burner structural features and performance characteristics, it is seen that the primary combustion chamber for the improved pressurized cyclonic burner of the present invention has a greater aspect ratio and larger choke restriction ratio than for the similar known cyclonic type solid fuel burners. Also, it is noted that the present burner provides a significantly higher Reynolds number for the combustion air entering the primary combustion chamber, and also provides greater tangential flow velocities and significantly greater centrifugal forces on the helical flowing solid fuel particles being combusted, as is additionally shown by FIG. 4. In addition, it is seen that the present burner provides substantially higher volumetric heat release rates and higher Reynolds numbers for the hot effluent gas material flowing from the pressurized burner primary and secondary combustion chambers than do the similar conventional burners. A comparison of the volumetric heat release ratings is also shown graphically in FIG. 5. Such improved burner performance at pressurized operating conditions was unexpected and the present invention advantageously provides the combustion industry with a significant and unobvious improvement in burner design and performance for pressurized burning of solid particulate fuels, such as for use in power producing processes.

Figure 6:
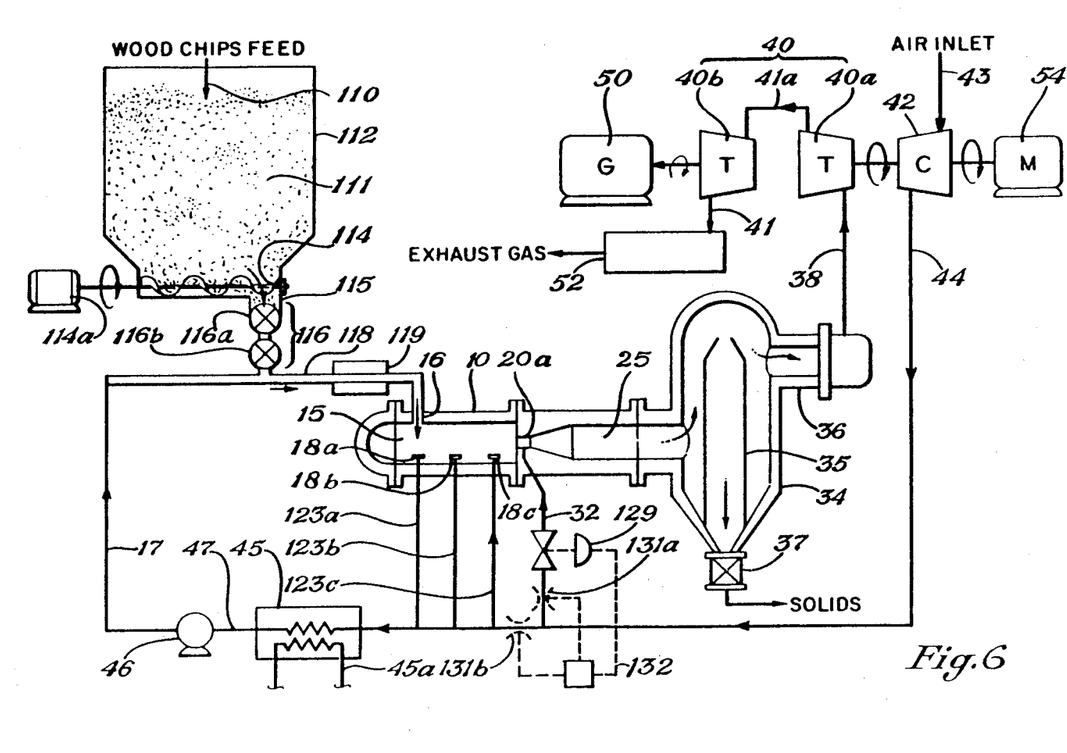
FIG. 6 is a schematic diagram of a system incorporating the burner of FIG. 1.

Referring now to FIG. 6, there will be described the system incorporating the burner 10 of FIG. 1.

A source 110 provides wood chips having size smaller than about 0.70 inch major dimension, and preferably smaller than about 0.130 inch, which chips are collected at 111 in the hopper 112 maintained at substantially atmospheric pressure. The chips 111 are fed from the hopper 112 by a variable speed screw conveyor 114 driven by motor 114a into a vertically oriented chute 115, and are then passed to a suitable feeder means 116 for delivering the wood particulate solids material into pressurized conveying conduit 118. Feeder 116 preferably consists of two rotary valves 116a and 116b connected in series and arranged for transferring the particulate solids material by gravity flow from the chute 115 into the conduit 118 at a pressure of about 3–20 atm. absolute, and preferably at 4–15 atm. pressure. The pressurized transport air from conduit 117 flows in conduit 118 at 40–120 ft/sec superficial velocity and preferably at 60–100 ft/sec velocity and pneumatically conveys the particulate solids material tangentially to the pressurized burner 10.

The particulate solids fuel material is fed pnuematically into burner 10 at near its inlet end through tangential inlet port 16 at superficial gas velocity exceeding about 80 ft/sec and preferably at 90–150 ft/sec into primary combustion chamber 15. Additional combustion air is introduced tangentially into the primary combustion chamber 15 at superficial velocity exceeding about 100 ft/sec, and preferably 110–150 ft/sec, through multiple spaced-apart openings or tuyeres 18a, 18b, 18c, etc., located axially along the length of chamber 15. If preheating or drying the solids in conduit 118 is desired, such preheating can be provided in heat exchanger 119 using any convenient source of heat such as turbine exhaust gas flowing through a jacket surrounding an elongated heat exchanger.

In the combustion chamber 15, the fuel solids are made to swirl around at high rotational velocity exceeding about 80 ft/sec and preferably at 100–150 ft/sec and produce high centrifugal forces exceeding about 140 gravitational units 'g', while the particles are rapidly heated by the hot chamber walls and progressively devolatized and burned to produce a hot pressurized effluent gas at a temperature of about 2100°–2800° F. The particles are also advantageously retained in the primary chamber 15 for prolonged combustion therein, not only by the high centrifugal forces but also by the effect of choke opening 20a, located at the exit end of the primary chamber 15. The choke opening 20a has a smaller cross-sectional opening area than the combustion zone 15 so as to prolong the particle solids combustion time therein and thereby provide for more complete combustion of the particulate fuel solids and produce very high volumetric heat release rates exceeding about 400,000 Btu/hr ft$^3$ of primary chamber volume and preferably 500,000–3,000,000 Btu/hr ft$^3$.

It has been found advantageous that the primary combustion chamber 15 should have a length/diameter aspect ratio for the chamber at least about 2.5:1 and usually need not exceed about 10:1 to provide for adequate combustion time for the solids. The combustion chamber inside diameter should be at least about 1.5 ft. for achieving a reasonable throughput rate for the combustible solids material and usually should not exceed about 3 ft. diameter to achieve adequate rotational velocity for the solid particles therein.

In the choke section 20 of chamber 15, the hot effluent gas is mixed with additional combustion air provided through conduit 32, to quench and cool the hot effluent gas to lower temperature such as 1500°–1800° F. suitable for extended use in a gas turbine.

The secondary or quench air is introduced in the choke zone through dual openings 30 oriented in a tangential direction opposite to that for tuyeres 18 in the primary combustion chamber 15, thereby producing highly turbulent shear type mixing of the two streams in the choke zone leading to secondary combustion zone 25. The flow of supplementary air at conduit 32 is controlled relative to combustion air in conduits 123a, 123b, 123c, etc. to the tuyeres 18a, 18b, 18c, etc. by controller 132, which monitors the air flows at flow meters 131a, 131b, and operates control valve 129 in conduit 32.

The resulting cooled effluent gas in the secondary combustion chamber 25, which may still contain a very small concentration of incombustible particulate solids, is passed through a cyclone type separator device 34 for substantially complete removal of such fine solids. The cyclone separator 34 preferably uses an axial flow type element 35 to provide for a more compact separator overall arrangement. From separator 34, a clean hot effluent gas stream at 1500°–1800° F. temperature is removed at 36, while the particulate solids removed are withdrawn through valve 37 for suitable disposal.

The cleaned effluent gas at 36 at 3–10 atm. pressure is then passed through conduit 38 to the inlet of gas turbine 40, which is connected to drive air compressor 42 for supplying pressurized air source at 44 for the combustion air at tuyers 18 and the quench air at 32. Also, a portion of the compressed air stream at 44 is cooled at 45 against stream 45a sufficient to avoid combustion of the particulate solids such as to about 200° F., usually by heat exchange with ambient air. The air at 47 is further compressed at 46, preferably by a positive displacement type compressor, to a differential pressure such as 2–10 psi and preferably 4–8 psi to provide the pressurized air at 117 required in conduit 118 for pneumatically conveying the wood chips into the burner 10.

Turbine 40 also rotatively drives a load device 50, which is usually an electric generator for generating electric power. From turbine 40, exhaust stream 41 at near atmospheric pressure and at 900°–1000° F. temperature can be passed to a heat recovery step at 52 and used as a heat source for generating steam, for heating another fluid used for heating purposes, or as a hot gas for preheating and/or drying the particulate feed material in heat exchanger 119.

The gas turbine unit 40 can be divided into two separate turbines each operating at different rotational shaft speeds, with the first turbine 40a used for driving the compressor 42 at a high rotational speed, and the intermediate exhaust gas stream at 41a from the first turbine 40a being passed to second turbine 40b which is gear-connected to an electric generator 50 for driving the generator at a lower rotational speed. Alternatively, a single shaft type turbine-compressor unit can be used in which both the compressor and electric generator are driven by a single turbine.

During start-up of the process, an auxillary burner (not shown) using a hydrocarbon fuel source such as propane is used to initially heat the refractory walls of primary combustion chamber 10 to a temperature sufficient to ignite the particulate solid fuel introduced at 16. Also, an auxillary drive motor 54 is used to drive compressor 42 to provide the hot air source initially needed for combustion. Also, air further compressed by compressor 46 is used for initially pneumatically conveying the particulate fuel solids through conduit 118 into the burner 10.

The solid fuel pressurized combustion and power generation process of this invention will be further described with reference to the following example of operations, which should not be construed as limiting the scope of the invention.

EXAMPLE

Wood chips and shavings, such as produced from a wood processing mill source and having nominal size of about ⅛ inch, were transferred from an atmospheric pressure collection hopper through tandem rotary feeder valves into a pressurized transfer pipe operating at about 5 atm. pressure. The wood chips were pneumatically conveyed at superficial gas velocity of about 80 ft/sec and fed tangentially into the inlet end of a horizontally oriented cylindrical cyclonic burner primary combustion chamber having dimensions as shown in Table II below. Pressurized combustion air was also supplied tangentially into the combustion chamber through 6 sets of dual tuyeres spaced-apart axially along the chamber length and at superficial gas velocity of about 100 ft/sec. Numerous observations of burner operation made through viewing ports indicated that the particulate solids were circulated in a swirling tangential velocity of about 100 ft/sec until consumed.

In the primary combustion chamber, the wood particles being circulated at the high rotational velocity developed high centrifugal forces of about 200 'g', which provided for prolonged total combustion of the particles at high Reynolds number and produced high volumetric heat release rates of about 1,800,000 Btu/hr ft$^3$. Thus, the solid fuel particles were rapidly devolatized and combusted to produce a hot effluent gas at 2700°–2800° F. temperature, which passed through a restricted choke opening at the exit end of the combustion chamber.

The resulting hot effluent gas at about 2700°–2800° F. temperature was quenched by additional pressurized secondary air injected tangentially into the throat portion of the choke opening. The quench air was injected tangentially in a direction opposite to that of the swirling effluent gas from the primary combustion chamber, thus producing highly turbulent shear type mixing of the two gas streams so that the hot effluent gas was effectively cooled to about 1700° F. and then passed into a secondary combustion chamber located immediately downstream from the choke.

From the secondary combustion chamber, a portion of the cleaned effluent gas containing about 250 ppm (wt.) fine particulate solids was then passed through a centrifugal type gas-solids separator in which the fine particulate solids in the gas were substantially all centrifugally separated and removed.

The resulting cooled and cleaned gas at about 1600° F. temperature is then expanded through a gas turbine driving a rotary air compressor to provide the pressurized transport and combustion air, and also driving an electric generator to produce net electric power. Based on burner operating data and related experience, the projected continuous operating period for this process is in excess of 30,000 hours.

Performance data obtained for the pressurized combustion step and typical performance for the power-producing process of this invention are provided in Table II below:

TABLE II

| Solid Fuel Pressurized Combustion and Process Characteristics | | |
|---|---|---|
| | Test Unit | Prototype |
| Primary combustion chamber: | | |
| Inside diameter, in. | 20 | 27 |
| Length/diameter, ratio | 3 | >3 |
| Choke diameter, in. | 6 | 6.5 |
| Wood Chip feed rate, lb/hr | 2020 | 6100 |
| Transport and combustion air flow rate, lb/hr | 26,300 | 85,500 |
| Combustor pressure, psia | 66 | 95 |
| Combustor pressure, atm. abs. | 4.5 | 6.5 |
| Volumetric heat release rate, Btu/hr ft$^3$ | 1,866,000 | 1,900,000 |
| Quench air flow rate, lb/hr | 9,000 | 85,000 |
| Secondary combustion chamber effluent: | | |
| Gas Temperature, °F. | 1780 | 1780 |
| Solids concentration, ppm (wt.) | 250 | 250 |
| Solids concentration of separator effluent, ppm (wt.) | 38 | 30 |
| Gas turbine: | | |
| Inlet temperature, °F. | | 1700 |
| Inlet pressure, psia | | 90 |
| Exhaust temperature, °F. | | 900 |
| Exhaust pressure, psia | | 15 |
| Gas flow rate, lb/hr | | 176,600 |
| Net power produced, kw | | 3000 |

From the above data, as is seen that the present process utilizes improved pressurized combustion of wood chips or other particulate solid combustible material to provide high volumetric heat release rates in the burner. The process also utilizes effective quenching and cooling of the hot effluent gas together with gas-solids separation to provide a clean pressurized effluent gas suitable for extended use in a gas turbine to produce electrical power.

Although the present invention has been described broadly and also in terms of certain preferred embodiments, it will be understood that various modification and variations can be made within the spirit and scope of the invention, which is defined by the following claims:

We claim:

1. An apparatus for burning particulate combustible fuel to produce a pressurized gas for operating a gas turbine, comprising:

a housing having side wall means forming a generally cylindrically shaped primary combustion chamber, a secondary chamber and a choke opening of reduced size between said primary combustion chamber and said secondary chamber, said secondary chamber being in fluid communication with said primary combustion chamber through said choke opening, the end of said primary combustion chamber opposite said choke opening being closed by end wall means, the end of said secondary chamber opposite said choke opening having an outlet opening for the passage of hot gas for use for operating a gas turbine, a fuel opening formed through said side wall means of said primary combustion chamber near said end wall means for introducing a particulate fuel under pressure therein generally tangentially to the inner wall of said primary combustion chamber and transverse to its axis such that the particulate fuel travels toward said choke opening in a helical path around the inner wall of said primary combustion chamber for burning therein for the production of hot gas under pressure for flow through said choke opening to said secondary chamber, a plurality of spaced apart tuyere openings formed through said side wall means of said primary combustion chamber along its length between said fuel opening and said choke opening for introducing under pressure, a combustion supporting gas comprising oxygen, into said primary combustion chamber generally tangentially to the inner wall thereof and transverse to its axis, to maintain the particulate fuel in a helical path near the hot inner wall of said primary combustion chamber, to provide oxygen near the particulate fuel in said helical path for oxidation thereof, to cause the particulate fuel to rotate a large number of times in said primary combustion chamber to increase the retention time of the particulate fuel in said primary combustion chamber for substantially complete combustion of the particulate fuel in said primary combustion chamber, the end of said primary combustion chamber through which said choke opening is formed comprises wall structure which extends abruptly inward from said inner wall of said primary combustion chamber to increase the retention time of the particulate fuel in said primary combustion chamber for substantially complete combustion of the particulate fuel in said primary combustion chamber, the reduced size of said choke opening also acting to increase the retention time of the particulate fuel in said primary combustion chamber with a minimum of pressure drop occurring across the choke opening such that the pressure of the gas at said outlet of said secondary chamber is sufficient to effectively operate a gas turbine, such pressure drop being controlled by the area and shape of said opening of said choke, the mass throughput of products of combustion and air through said choke opening, and the pressure in said primary combustion chamber, and at least one quench gas opening formed through side wall means of said choke opening intermediate its ends for introducing a quench gas into said choke opening for cooling the hot gas flowing through said choke opening to said secondary chamber to a temperature suitable for use for operating a gas turbine, said quench gas opening being located to introduce the quench gas into said choke opening in a direction generally tangential to the said side wall means of said choke opening in a direction generally opposite to that of the helical path of the hot gas in said primary combustion chamber.

2. The apparatus of claim 1, wherein:
said inner wall of said primary combustion chamber is formed of a refractory material which becomes hot and causes the particulate fuel to burn when the particulate fuel travels in the helical path around said inner wall.

3. The apparatus of claim 1, wherein:
said secondary chamber having enough volume to assure the complete mixing of hot combustion gas and quench gas so as to reduce the gas temperature everywhere at said outlet of said secondary chamber in order to provide a gas that will effectively operate a gas turbine.

4. The apparatus of claim 1, comprising:
fuel source means for introducing the particulate fuel entrained with air under pressure into said primary combustion chamber through said fuel opening,
combustion supporting gas source means for introducing the combustion supporting gas into said primary combustion chamber under pressure at a given velocity through said tuyere openings, and
quench gas source means for introducing the quench gas into said choke opening through said quench gas opening.

5. The apparatus of claim 4, wherein:
the length and diameter of said primary combustion chamber, the size of said choke opening, the positions of said fuel opening and tuyere openings being such that said fuel source means and said combustion supporting gas source means can be operated to cause the helix angle of the helical path of the particulate fuel to be only slightly less than 90° relative to the axis of said primary combustion chamber.

6. The apparatus of claim 4, comprising:
means coupled to the outlet of said secondary chamber for separating any existing particulate solids from the hot gas flowing from said secondary chamber to produce a cleaner gas for use for operating a gas turbine.

7. The apparatus of claim 5, comprising:
means coupled to the outlet of said secondary chamber for separating any existing particulate solids from the hot gas flowing from said secondary chamber to produce a cleaner gas for use for operating a gas turbine.

8. The apparatus of claim 1, comprising:
fuel source means for introducing the particulate fuel entrained with air under pressure into said primary combustion chamber through said fuel opening,
combustion supporting gas conduit means extending to said housing for introducing the combustion supporting gas into said primary combustion chamber under pressure at a given velocity through said tuyere openings, and
quench gas conduit means extending to said housing for introducing the quench gas into said choke opening through said quench gas opening,
said quench gas conduit means being separate from said combustion supporting gas conduit means.

9. The apparatus of claim 1, wherein:
said primary combustion chamber is capable of operating at an internal pressure of at least 3 atmospheres absolute,
the ratio of the length of said primary combustion chamber relative to its diameter is between about 2:1 and 10:1,
the length to width aspect ratio of each of said tuyere openings is between about 2:1 and 10:1.

10. The apparatus of claim 1, comprising:
fuel source means for introducing into said primary combustion chamber through said fuel opening, the particulate fuel entrained with air at a pressure of at least 3 atmospheres absolute,
combustion supporting gas source means for introducing into said primary combustion chamber through said tuyere openings, the combustion supporting gas at a velocity of at least 80 ft/sec at a Reynolds number relative to the tuyere openings exceeding about 900,000 to provide a swirling helical flow pattern for the particulate fuel at a high rotational velocity to produce a volumetric heat release rate in the primary combustion chamber exceeding about 400,000 BTU/hr ft$^3$, said primary combustion chamber being adapted to be operated at an internal pressure of at least 3 atmospheres pressure absolute, and
quench gas source means for introducing the quench gas into said choke opening through said quench gas opening.

11. The apparatus of claim 9, comprising:
fuel source means for introducing into said primary combustion chamber through said fuel opening, the particulate fuel entrained with air at a pressure of at least 3 atmospheres absolute,
combustion supporting gas source means for introducing into said primary combustion chamber through said tuyere openings, the combustion supporting gas at a velocity of at least 80 ft/sec at a Reynolds number relative to the tuyere openings exceeding about 900,000 to provide a swirling helical flow pattern for the particulate fuel at a high rotational velocity to produce a volumetric heat release rate in the primary combustion chamber exceeding about 400,000 BTU/hr ft$^3$, said primary combustion chamber being adapted to be operated at an internal pressure of at least 3 atmospheres pressure absolute, and
quench gas source means for introducing the quench gas into said choke opening through said quench gas opening.

12. The apparatus of claim 11, wherein:
said combustion supporting gas source means comprises combustion supporting gas conduit means extending to said housing,
said quench source means comprises quench gas conduit means extending to said housing,
said quench gas conduit means being separate from said combustion supporting gas conduit means.

13. The apparatus of claim 6, wherein:
said combustion supporting gas source means comprises combustion supporting gas conduit means extending to said housing,
said quench gas source means comprises quench gas conduit means extending to said housing,
said quench gas conduit means being separate from said combustion supporting gas conduit means.

14. The apparatus of claim 6, wherein:
said primary combustion chamber is capable of operating at an internal pressure of at least 3 atmospheres absolute, the ratio of the length of said primary combustion chamber relative to its diameter is between about 2:1 and 10:1, the length to width aspect ratio of each of said tuyere openings is between about 2:1 and 10:1.

15. The apparatus of claim 6, wherein:

said fuel source means is capable of introducing into said primary combustion chamber through said fuel opening, the particulate fuel entrained with air at a pressure of at least 3 atmospheres absolute, said combustion supporting gas source means is capable of introducing into said primary combustion chamber through said tuyere openings, the combustion supporting gas at a velocity of at least 80 ft/sec at a Reynolds number relative to the tuyere opening exceeding about 900,000 to provide a swirling helical flow pattern for the particulate fuel at a high rotational velocity to produce a volumetric heat release rate in the primary combustion chamber exceeding about 400,000 BTU/hr ft$^3$, said primary combustion chamber being adapted to be operated at an internal pressure of at least 3 atmospheres pressure absolute.

16. The apparatus of claim 14, wherein:

said fuel source means is capable of introducing into said primary combustion chamber through said fuel opening, the particulate fuel entrained with air at a pressure of at least 3 atmospheres absolute, said combustion supporting gas source means is capable of introducing into said primary combustion chamber through said tuyere openings, the combustion supporting gas at a velocity of at least 80 ft/sec at a Reynolds number relative to the tuyere openings exceeding about 900,000 to provide a swirling helical flow pattern for the particulate fuel at a high rotational velocity to produce a volumetric heat release rate in the primary combustion chamber exceeding about 400,000 BTU/hr ft$^3$, said primary combustion chamber being adapted to be operated at an internal pressure of at least 3 atmospheres pressure absolute.

17. The apparatus of claim 16, wherein:

said combustion supporting gas source means comprises combustion supporting gas conduit means extending to said housing, said quench gas source means comprises quench gas conduit means extending to said housing, said quench gas conduit means being separate from said combustion supporting gas conduit means.

* * * * *